(12) United States Patent
Mukhopadhyay et al.

(10) Patent No.: US 11,547,038 B2
(45) Date of Patent: Jan. 10, 2023

(54) PLENUM FOR AIR SEEDING MACHINE AND METHOD OF USE

(71) Applicant: DEERE & COMPANY, Moline, IL (US)

(72) Inventors: Sourabh Mukhopadhyay, Asansol (IN); Andrew W. Harmon, Davenport, IA (US); Ganesh Pu Nimbalkar, Ahmednagar (IN); Vishaal Kamalapurkar, Hyderabad (IN)

(73) Assignee: DEERE & COMPANY, Moline, IL (US)

( * ) Notice: Subject to any disclaimer, the term of this patent is extended or adjusted under 35 U.S.C. 154(b) by 178 days.

(21) Appl. No.: 16/931,807

(22) Filed: Jul. 17, 2020

(65) Prior Publication Data

US 2021/0127557 A1    May 6, 2021

Related U.S. Application Data

(60) Provisional application No. 62/928,546, filed on Oct. 31, 2019.

(51) Int. Cl.
*B65G 53/52* (2006.01)
*A01C 7/08* (2006.01)
*A01C 7/20* (2006.01)

(52) U.S. Cl.
CPC .............. *A01C 7/082* (2013.01); *A01C 7/205* (2013.01)

(58) Field of Classification Search
CPC ...... B65B 53/528; F16L 41/023; F16L 41/03; Y10T 137/85938
USPC ...................................... 406/181; 137/561 A
See application file for complete search history.

(56) References Cited

U.S. PATENT DOCUMENTS

| | | | | |
|---|---|---|---|---|
| 1,825,668 A | * | 10/1931 | Kennedy | F23K 3/00 406/155 |
| 1,871,853 A | * | 8/1932 | Kennedy | F23K 3/00 406/155 |
| 2,148,414 A | * | 2/1939 | Wolfert | F25B 39/028 137/262 |
| 2,208,788 A | * | 7/1940 | Courtney | B65G 53/528 406/155 |
| 2,255,442 A | * | 9/1941 | Tranter | F16L 41/03 406/155 |
| 3,265,442 A | * | 8/1966 | Willis, Jr. | B65G 53/528 406/181 |

(Continued)

*Primary Examiner* — Joseph A Dillon, Jr.
(74) *Attorney, Agent, or Firm* — Taft Stettinius & Hollister LLP; Stephen F. Rost (57) ABSTRACT

An air flow system for an air seeding machine includes a tank configured to store an agricultural commodity, a plenum, conduits, and a blower configured to push air flow through the plenum and the conduits to the tank. The plenum includes a uniformly-sloped side wall and geometric first and second ends bounding the side wall. The plenum further includes bleed ports coupled to bleed conduits and configured to conduct air flow to an interior volume of the tanks. The plenum further includes primary ports coupled to primary conduits and configured to conduct air flow to the tanks. The primary conduits receive commodity from the tanks to be deposited in the soil. The geometry of the plenum facilitates an adequate balance of air flow between the primary and bleed conduits so that the commodity most-effectively enters the air stream conducted by the primary conduits.

20 Claims, 5 Drawing Sheets

(56) References Cited

U.S. PATENT DOCUMENTS

| | | | | |
|---|---|---|---|---|
| 3,936,262 | A * | 2/1976 | Hehl | B29C 45/22 137/561 A |
| 4,284,243 | A * | 8/1981 | Shaner | A01C 23/023 111/119 |
| 4,479,444 | A * | 10/1984 | Takata | F16L 41/03 111/118 |
| 4,562,968 | A * | 1/1986 | Widmer | A01C 15/04 111/175 |
| 5,101,847 | A * | 4/1992 | Oribe | F24F 7/06 137/561 A |
| 5,125,583 | A * | 6/1992 | Strand | A01M 9/003 406/79 |
| 5,265,547 | A * | 11/1993 | Daws | A01C 7/087 111/175 |
| 5,625,947 | A * | 5/1997 | Crawford | B23P 15/00 29/890.141 |
| 5,775,585 | A * | 7/1998 | Duello | A01C 15/04 239/654 |
| 5,979,343 | A | 11/1999 | Gregor et al. | |
| 6,503,392 | B1 * | 1/2003 | Tyson | C02F 1/006 137/561 A |
| 6,811,358 | B2 * | 11/2004 | Bauver | B65G 53/528 406/182 |
| 7,165,571 | B1 * | 1/2007 | Buzdum | F16L 41/02 285/12 |
| 7,216,672 | B1 * | 5/2007 | Chen | F16L 41/16 251/149.8 |
| 7,255,123 | B2 * | 8/2007 | Cedergaard | B65G 47/72 137/262 |
| 7,785,043 | B2 * | 8/2010 | Elsen | F17D 1/088 251/212 |
| 8,151,885 | B2 * | 4/2012 | Bull | E21B 43/04 166/305.1 |
| 8,403,602 | B2 * | 3/2013 | Zarnescu | F23K 3/02 110/101 R |
| 8,469,636 | B2 * | 6/2013 | Jost | A01C 7/082 111/175 |
| 8,500,171 | B2 * | 8/2013 | Tadlock | F16L 41/03 285/125.1 |
| 8,578,965 | B2 * | 11/2013 | Klages | F23J 15/003 137/561 A |
| 8,684,636 | B2 * | 4/2014 | Dunstan | A01C 7/084 111/175 |
| 8,876,439 | B2 * | 11/2014 | Sheehan | B01J 8/0015 198/534 |
| 8,978,578 | B2 * | 3/2015 | Jittu | B05B 14/48 118/313 |
| 9,486,751 | B2 * | 11/2016 | Collins | C02F 7/00 |
| 9,854,731 | B2 * | 1/2018 | Henry | B65G 53/50 |
| 10,251,332 | B2 * | 4/2019 | Roberge | A01C 7/084 |
| 10,427,113 | B2 * | 10/2019 | Roberge | B65G 53/42 |
| 10,465,818 | B2 * | 11/2019 | Lo | F16K 5/0442 |
| 10,537,054 | B2 * | 1/2020 | Roberge | B05B 13/005 |
| 10,549,931 | B2 * | 2/2020 | Roberge | B65G 53/528 |
| 10,670,176 | B2 * | 6/2020 | Byrne | F04B 11/0008 |
| 10,694,660 | B2 * | 6/2020 | Harmon | A01C 7/102 |
| 10,743,462 | B2 * | 8/2020 | Setterdahl | A01C 7/20 |
| 10,786,426 | B2 * | 9/2020 | Backer | A61H 33/027 |
| 10,814,292 | B2 * | 10/2020 | Roberge | A01C 7/084 |
| 10,827,668 | B2 * | 11/2020 | Hui | A01C 7/082 |
| 10,864,397 | B2 * | 12/2020 | Beasley | A62C 35/02 |
| 10,918,029 | B2 * | 2/2021 | Henry | F16L 41/023 |
| 11,066,254 | B1 * | 7/2021 | Pederson | A01C 7/082 |
| 11,098,806 | B2 * | 8/2021 | Kessler | B65G 53/56 |
| 11,259,459 | B2 * | 3/2022 | Ruppert | B65G 53/06 |
| 11,284,560 | B2 * | 3/2022 | Cowan | A01C 5/062 |
| 11,305,951 | B2 * | 4/2022 | Harmon | B65G 53/56 |
| 2008/0105311 | A1 * | 5/2008 | Bulter | F16L 41/021 137/625.11 |
| 2012/0186501 | A1 * | 7/2012 | Zarnescu | F23K 3/02 110/101 R |
| 2012/0312211 | A1 * | 12/2012 | Hubalek | A01C 7/084 111/175 |
| 2013/0333779 | A1 * | 12/2013 | Robinson | F16L 57/06 137/561 A |
| 2014/0294519 | A1 * | 10/2014 | Watson | F16K 1/2014 406/154 |
| 2014/0373940 | A1 * | 12/2014 | Toader, Jr. | F15B 21/041 137/267 |
| 2016/0205865 | A1 * | 7/2016 | Friggstad | A01C 7/084 |
| 2017/0079198 | A1 | 3/2017 | Borkgren | |
| 2017/0247199 | A1 | 8/2017 | Hui et al. | |
| 2018/0343792 | A1 * | 12/2018 | Roberge | A01C 7/082 |
| 2019/0021214 | A1 | 1/2019 | Roberge et al. | |
| 2020/0271233 | A1 * | 8/2020 | Ye | F16K 5/0442 |
| 2020/0293072 | A1 * | 9/2020 | Ly | F16L 41/023 |
| 2020/0325743 | A1 * | 10/2020 | Brezden | E21B 21/10 |
| 2021/0053774 | A1 * | 2/2021 | Trushin | B65G 53/04 |
| 2021/0204470 | A1 * | 7/2021 | Tollefsrud | B05B 7/1477 |
| 2021/0282312 | A1 * | 9/2021 | Ruppert | A01C 7/084 |
| 2021/0282313 | A1 * | 9/2021 | Ruppert | A01C 15/00 |
| 2021/0292107 | A1 * | 9/2021 | Ruppert | A01C 15/00 |
| 2021/0388931 | A1 * | 12/2021 | George | F16L 41/03 |
| 2022/0018476 | A1 * | 1/2022 | Hamilton | F16L 41/03 |
| 2022/0078967 | A1 * | 3/2022 | Crucianelli | B65G 53/40 |

\* cited by examiner

PLENUM FOR AIR SEEDING MACHINE AND METHOD OF USE

RELATED APPLICATIONS

This application claims priority to U.S. Provisional Application Ser. No. 62/928,546, filed Oct. 31, 2019, the disclosure of which is hereby incorporated by reference in its entirety.

FIELD OF THE DISCLOSURE

The present disclosure relates generally to air seeding machines and, more specifically, to a plenum used to facilitate the flow of commodity through conduits in an air seeding machine.

BACKGROUND

Air seeders utilize airflow through conduits to direct a commodity such as fertilizer or seed to a desired location. Typically, the commodity is stored in a tank or tanks on a cart and selectively provided to a conduit to be further transported to a drill assembly or otherwise ultimately placed in the underlying soil. A fan or blower provides air flow to transport the commodity. A housing, splitter, or plenum may direct air flow from the fan to the conduits, and challenges may exist directing sufficient airflow from the fan to the conduits.

SUMMARY

In an illustrative embodiment, an air flow system for use in an air seeding machine includes: a tank configured to store an agricultural commodity; a plenum including: a body portion including: a first end defining an inlet of the body portion, a second end defining an outlet of the body portion, a longitudinal axis extending through the first end and the second end, and a side wall extending around the longitudinal axis between the first end and the second end; and a bleed port positioned between the body portion of the plenum and the tank; and a blower including a plurality of fan blades configured to rotate about an axis of rotation to provide air flow to the tank.

In some embodiments, the second end of the body portion of the plenum defines an ellipse. In some embodiments, the first end of the body portion of the plenum defines a circle he ellipse includes a major axis that is the longest diameter of the ellipse, and the major axis is perpendicular to the axis of rotation of the plurality of fan blades.

In some embodiments, the first end of the body portion defines a first plane. In some embodiments, the side wall, when viewed in any plane perpendicular to the first plane, includes a segment extending at a constant angle relative to the longitudinal axis between the first end and the second end of the body portion.

In some embodiments, the second end of the body portion defines a second plane, and the first plane and the second plane are substantially parallel. In some embodiments, the first plane and the second plane are each perpendicular to the longitudinal axis.

In some embodiments, the side wall extends around the longitudinal axis between the first end and the second end to form an interior of the body portion; and the side wall includes an aperture opening directly from the interior of the body portion to the bleed port. The plenum further includes a plurality of primary ports, each primary port of the plurality of primary ports includes a first end and a second end spaced apart from the second end, and the plenum author comprises a plurality valves each positioned in a primary port and spaced apart from the first end and the second end of the primary port.

In some embodiments, the plurality of valves are butterfly valves. In some embodiments, the butterfly valves include: a first pair of butterfly valves having a first pair of commonly-sized blockers coupled to a first rod that is configured to rotate the first pair of commonly-sized blockers to open and close the first pair of butterfly valves; a second pair of butterfly valves having a first pair of commonly-sized blockers coupled to a second rod that is configured to rotate the second pair of commonly-sized blockers to open and close the second pair of butterfly valves; and a third pair of butterfly valves having a third pair of commonly-sized blockers coupled to a third rod that is configured to rotate the third pair of commonly-sized blockers to open and close the third pair of butterfly valves.

In another illustrative embodiment, a plenum adapted for use with an air seeding machine includes: a body portion including: a first end, a second end opposite the first end, and a longitudinal axis extending through the first end and the second end, and a side wall extending around the longitudinal axis between the first end and the second end to form an interior portion of the plenum; a plurality of primary ports coupled to the second end of the body portion; and a plurality of bleed ports coupled to the side wall of the body portion. The first end of the body portion defines an inlet of the body portion, the second end of the body portion defines an outlet of the body portion, and the side wall is formed of a plurality of segments each extending at a constant angle relative to the longitudinal axis between the first end and the second of the body portion.

In some embodiments, the second end of the body portion is substantially elliptically-shaped. In some embodiments, the first end of the body portion is substantially circularly-shaped. The first end of the body portion defines a first plane, and the inlet of the body portion is disposed in the first plane. The second end of the body portion defines a second plane, and the outlet of the body portion is disposed in the second plane. The first plane is substantially perpendicular to the longitudinal axis. The first plane and the second plane are substantially parallel to one another.

In some embodiments, each primary port of the plurality of primary ports includes a first end and a second end spaced apart from the second end, and the plenum further comprises a plurality of valves each positioned in a primary port between and spaced apart from the first end and the second end of the primary port. The plurality of primary ports includes: a first pair of commonly-sized ports, a second pair of commonly-sized ports differently-sized than the first pair of commonly sized ports, and a third pair of commonly-sized ports differently-sized than each of the first pair of commonly-sized ports and the second pair of commonly-sized ports.

In another illustrative embodiment, a method of providing air flow to a tank of an air seeding machine, includes: rotating a plurality of fan blades about an axis of rotation to provide a uniform output of air flow to the inlet of a plenum disposed at a first end of the plenum; guiding a portion of the uniform output of air flow from the first end of the plenum, which defines a first plane, to a second end of the plenum, via a side wall of the plenum extending from the first end of the plenum to the second end of the plenum, wherein the side wall includes a uniformly-sloped cross-section when viewed any plane perpendicular the first plane; and guiding a portion of the uniform output of air flow through an aperture in the side wall of the plenum into a bleed port coupled between the plenum and the tank.

In some embodiments, the method includes opening a valve positioned in a primary port coupled to the second end of the plenum to decrease a pressure in the tank, wherein the valve is spaced apart from the second end of the plenum; and closing the valve to increase pressure in the tank.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
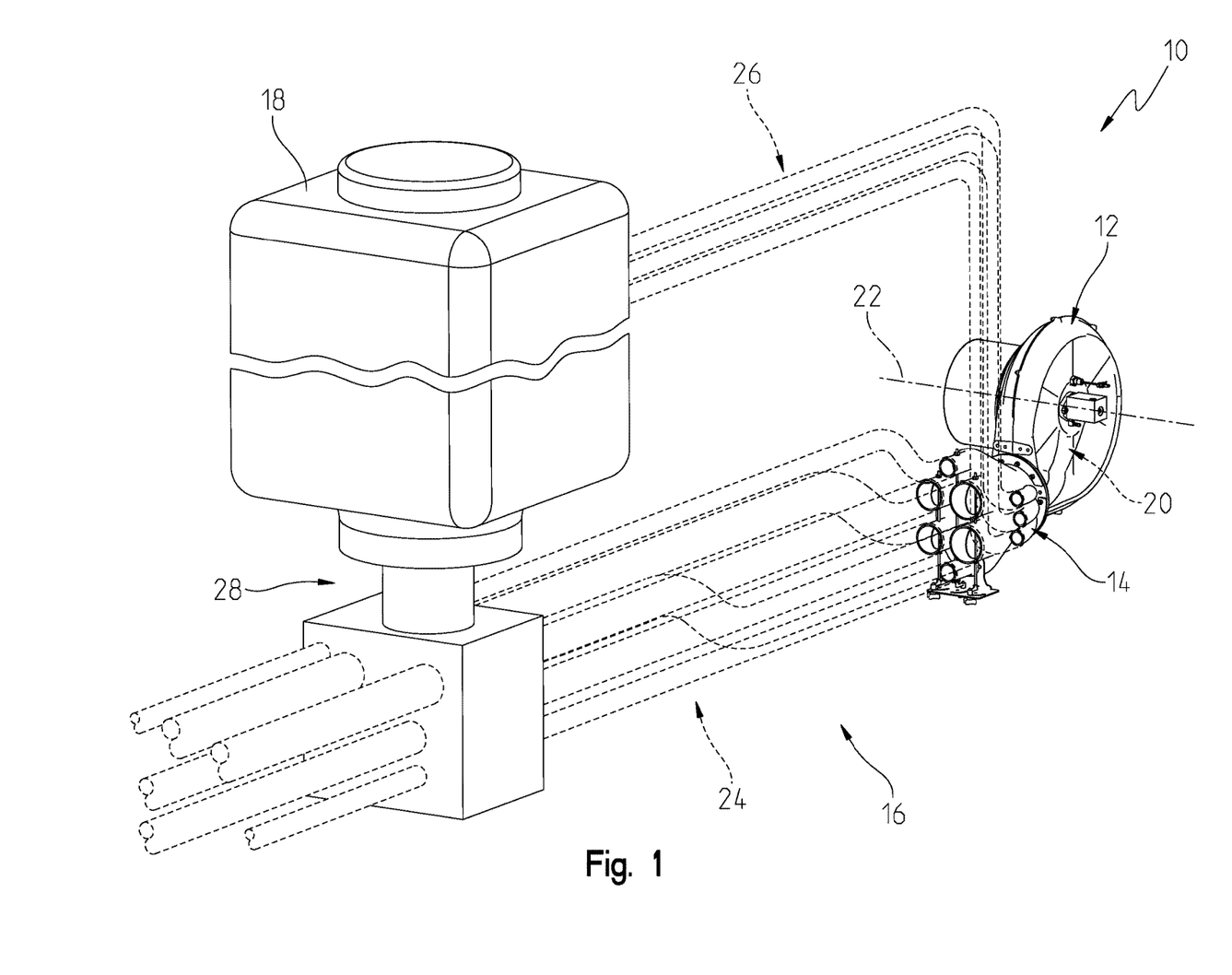
FIG. 1 is a perspective view of an air flow system for an air seeding machine showing, in phantom, conduits that conduct air from a plenum to a tank of the air seeding machine.

An air flow system 10 is shown in FIG. 1. The air flow system is adapted for use in an air seeding machine. The air seeding machine may include a seeder having a commodity cart towed by a tractor or other prime mover. The commodity cart may have one or more tanks for storing seed, fertilizer, or another commodity to be applied to the soil. The commodity cart may also include a drill or implement that applies the commodity to the soil. The commodity cart may be a "tow behind" cart meaning that the cart follows the drill. In alternative arrangements, the cart may be a "tow between" cart meaning that the cart is between the tractor and drill. In yet a further possible arrangement, the cart and drill can be combined onto a common frame, and the cart and frame may be collectively referred to as a combo-drill.

It should be appreciated that the examples of the cart and the frame described above are non-limiting. The term "cart" should be broadly construed to include any device towed by a prime mover that is supported on one or more axles, such as a trailer, wagon, cart, implement, etc. Additionally, any number of tanks can be provided on the air cart. The tank or tanks can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

As shown in FIG. 1, the air flow system 10 includes blower 12, a plenum 14, and a conduit system 16. The plenum 14 is positioned between the blower 12 and the conduit system 16. The blower 12 includes a plurality of fan blades 20 configured to rotate about an axis of rotation 22 to provide air flow through the plenum 14 to the conduit system 16. The conduit system 16 includes multiple conduits each configured to conduct air therethrough. The conduits are coupled to a tank 18 (or in some embodiments, tanks 18). In the illustrative embodiment shown in FIG. 1, the conduit system 16 includes six primary conduits 24 and three bleed conduits 26; however, it should be appreciated that any number of primary and bleed conduits may be provided, so long as the conduits adequately meet the needs of the air flow system 10.

In some embodiments, a commodity meter assembly 28 is located at the bottom of each tank 18 and delivers commodity from the tank 18 at a controlled rate to the primary conduits 24 and to the air flow stream moving through the primary conduits 24. The three bleed conduits 26 are arranged to conduct air flow from the plenum 14 to an interior space of the tank 18. The amount of air flow delivered to the tank 18 by the bleed conduits 26 is carefully selected and, in some applications, maximized to ensure that a desired balance is maintained between the airflow entering the tank 18 from the primary conduits 24 versus that from the bleed conduits 26. As will be described in greater detail below, the particular shape and arrangement of the plenum 14 facilitates this desired balance of air flow.

In some embodiments, each primary conduit 24 carries commodity in the air flow stream to a distribution tower that is located on the drill. A distributing manifold may divide the flow of product into a number of secondary distribution lines. Each secondary distribution line may deliver commodity to one of a plurality of ground engaging tools which opens a furrow in the soil and deposits the commodity therein. A firming or closing wheel associated with ground engaging each tool trails the tool and firms the soil over the product deposited in the soil.

Figure 2:
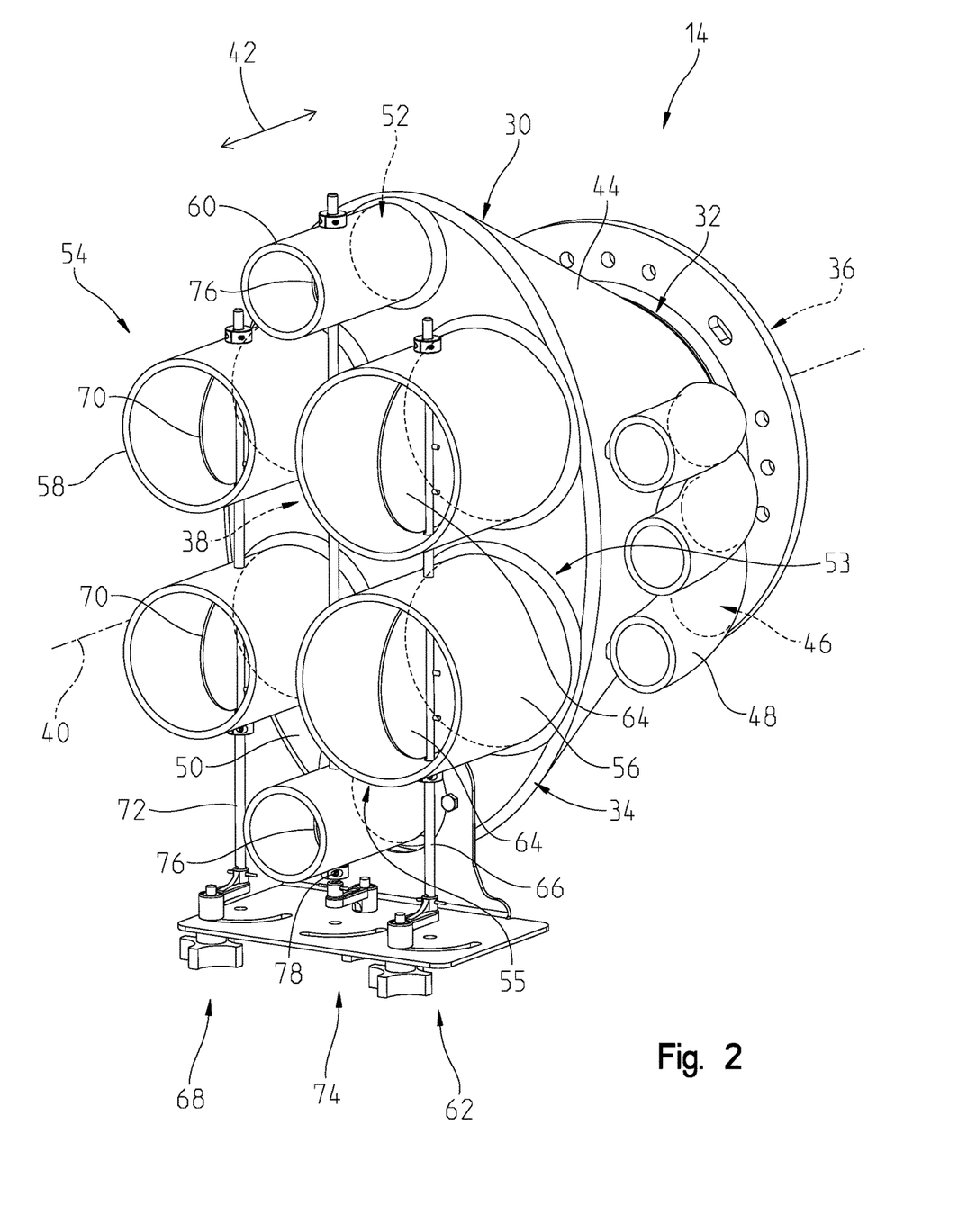
FIG. 2 is a perspective view of the plenum shown in FIG. 1.

Referring now to FIG. 2, a perspective view of the plenum 14 is shown. The plenum 14 includes a body portion 30 having a first end 32 coupled to the blower 12 and a second end 34 opposite the first end 32. The first end 32 defines an inlet 36 of the body portion 30. The second end 34 defines an outlet 38 of the body portion 30. A longitudinal axis 40 extends in the axial direction (shown by the arrow 42) through the first end 32 and the second end 34 of the body portion 30. The body portion 30 of the plenum 14 also includes a side wall 44 extending around the longitudinal axis 40 and extending between the first end 32 and the second end 34. The first end 32, the second end 34, and the side wall 44 each cooperate to define an interior portion of the of the plenum 14.

The side wall 44 of the plenum 14 defines a plurality of apertures 46 that each open to a corresponding bleed port 48. In this arrangement, each bleed port 48 is coupled to the side wall 44. Further, each of the bleed ports 48 are coupled to and in fluid communication with a corresponding bleed conduit 26. In some embodiments, the bleed ports 48 and the side wall are a single monolithic component. In the illustrative embodiment, each of the bleed ports 48 are commonly-size such that each bleed port has the same diameter. The size and the placement of the bleed ports 48 (on the side wall 44) are carefully selected to achieve the desired amount of airflow through the bleed conduits 26 coupled thereto.

In some embodiments, the second end 34 of the body of portion plenum 14 includes an end plate 50 having a plurality of apertures 52 defined therein. In some embodiments, the plate 50 covers the outlet 38. In other embodiments, the end plate 50 and the side wall 44 are a single monolithic component such that the outlet 38 is inclusive of each aperture 52 of the end plate 50. In any event, each of the apertures 52 opens to a corresponding primary port 54. In this arrangement, each primary port 54 is coupled to the plate 50. In some embodiments, each primary port 54 and the end plate 50 are a single monolithic component. Further, each of the primary ports 54 are coupled to and in fluid communication with a corresponding primary conduit 24.

In the illustrative embodiment, the plenum 14 includes a first pair of commonly-sized primary ports 56, a second pair of commonly-sized ports 58, and a third pair commonly-sized primary ports 60. The first pair of commonly-sized primary ports 56 includes two primary ports 54 each having a first diameter. The second pair of commonly-sized primary ports 58 includes two primary ports 54 each having a second diameter smaller than the first diameter. The third pair of commonly-sized primary ports 60 includes two primary ports 54 each having a third diameter smaller than the second diameter. It should be appreciated that in other embodiments, the plenum 14 may include any number of primary ports 54 each having various sizes, so long as the number and size of the primary ports adequately provide airflow to move commodity through the primary conduits 24 to the soil.

In some embodiments, each primary port 54 includes a blocker or a valve configured to divert air flow away from a primary conduit 24. Each valve is positioned in a primary port 54, and each valve is spaced apart from a first end 53 and a second end 54 of the primary port 54.

In the illustrative embodiment, the first pair of primary ports 56 includes a first pair of butterfly valves 62. The first pair of the butterfly valves 62 includes a first pair of commonly-sized blockers 64 each having a diameter substantially equal to the diameter of the first pair of commonly-sized primary ports 56. Each blocker 64 is coupled to a first rod 66 that is configured to rotate the first pair of commonly-sized blockers 64. The second pair of primary ports 58 includes a second pair of butterfly valves 68. The second pair of the butterfly valves 68 includes a second pair of commonly-sized blockers 70 each having a diameter substantially equal to the diameter of the second pair of commonly-sized primary ports 58. Each blocker 70 is coupled to a second rod 72 that is configured to rotate the second pair of commonly-sized blockers 70. The third pair of primary ports 60 includes a third pair of butterfly valves 74. The third pair of butterfly valves 74 includes a third pair of commonly-sized blockers 76 each having a diameter substantially equal to the diameter of the third pair of commonly-sized primary ports 60. Each blocker 76 is coupled to a third rod 78 that is configured to rotate the third pair of commonly-sized blockers 76.

It should be appreciated that each of the blockers 64, 70, 76 is positioned in a primary port 54. Further, each blocker 64, 70, 76 is spaced apart from the first end 53 and the second end 55 of the corresponding primary port 54.

A user may rotate any one of the rods 66, 72, 78 to close the pair of corresponding butterfly valves 62, 68, 74. In doing so, a user may divert air flow away from the primary conduits 24 and to the bleed conduits 26. In this way, a user may increase the pressure in the tank 22 by closing at least one of the pair of butterfly valves 62, 68, 74. Increasing the pressure in the tank 22 is beneficial at times because this prevents air flow from the primary conduits 24 from recirculating or entering the tank 22. This facilitates the proper distribution of commodity from the tank 22 into the air flow stream in the primary conduit 24 and ensures that the air flow stream continues to move through the primary conduit 24 to distribute the commodity to the soil. Additionally, a user may rotate any one of the rods 66, 72, 78 to open the pair of corresponding butterfly valves 62, 68, 74. In doing so, a user may facilitate a greater volume air flow into primary conduits 24. In this way, a user may decrease the pressure in the tank 22 and increase the pressure in the primary conduits 24 by closing at least one of the pair of butterfly valves 62, 68, 74. Ultimately, a user may open and close the butterfly valves 62, 68, 74 to redirect airflow exiting the plenum 14 as desired for the particular application.

Figure 3:
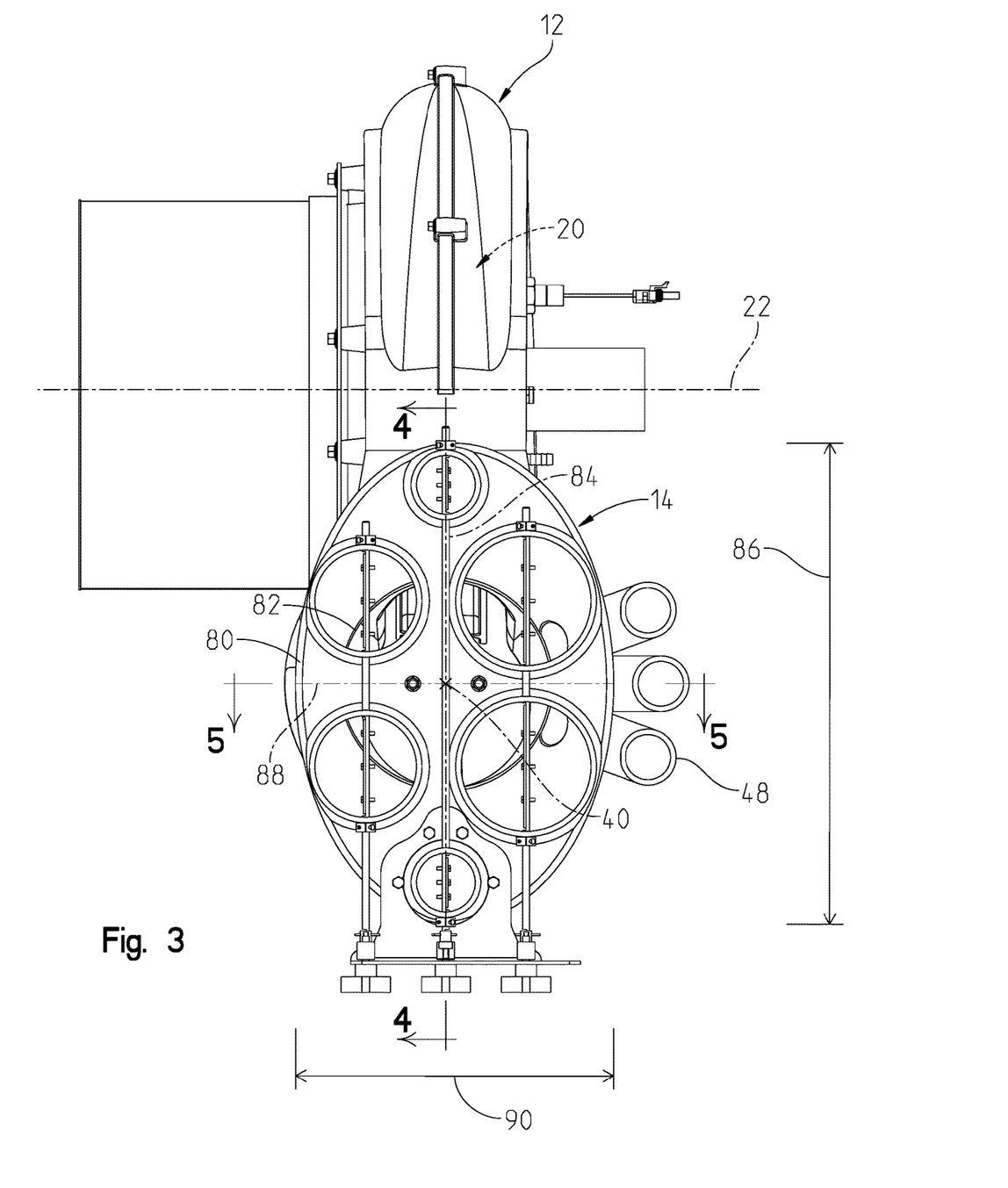
FIG. 3 is a front view of the plenum shown in FIG. 2.

Referring now to FIG. 3, a front view of the plenum 14 is shown with the butterfly valves 62, 68, 74 open such that the interior of the plenum 14 is visible. In the illustrative embodiment, the second end 34 of the body portion 30 of the plenum 14 defines an ellipse 80. In other words, the second end 34 is substantially elliptically-shaped. The first end 32 of the body portion 30 of the plenum 14 defines an circle 82. In other words, the first end 32 is substantially circularly-shaped. The ellipse 80 includes a major axis 84 that is the longest diameter of the ellipse 80, and the major axis 84 extends a distance 86. The ellipse also includes a minor axis 88 that is the shortest diameter of the ellipse 80, and the minor axis 88 extends a distance 90 that is less than the distance 86. The major axis 84 is perpendicular to the minor axis 88. As shown in FIG. 3, the major axis 84 is perpendicular to the axis of rotation 22 of the fan blades 20, and such an arrangement optimizes or maximizes uniform airflow across the plenum 14.

Figure 4:
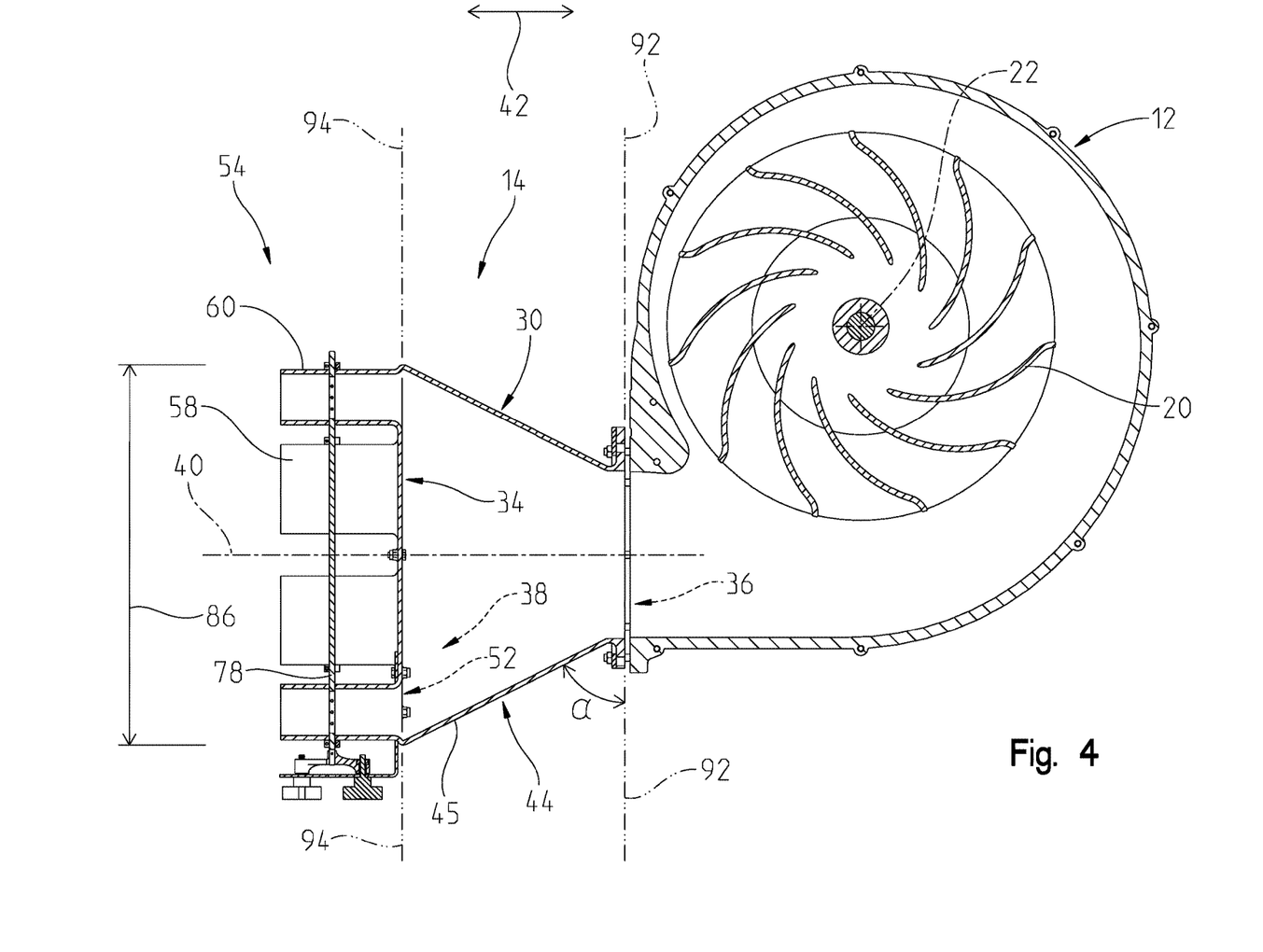
FIG. 4 is a side section view of the plenum and a blower shown in FIG. 1.
Figure 5:
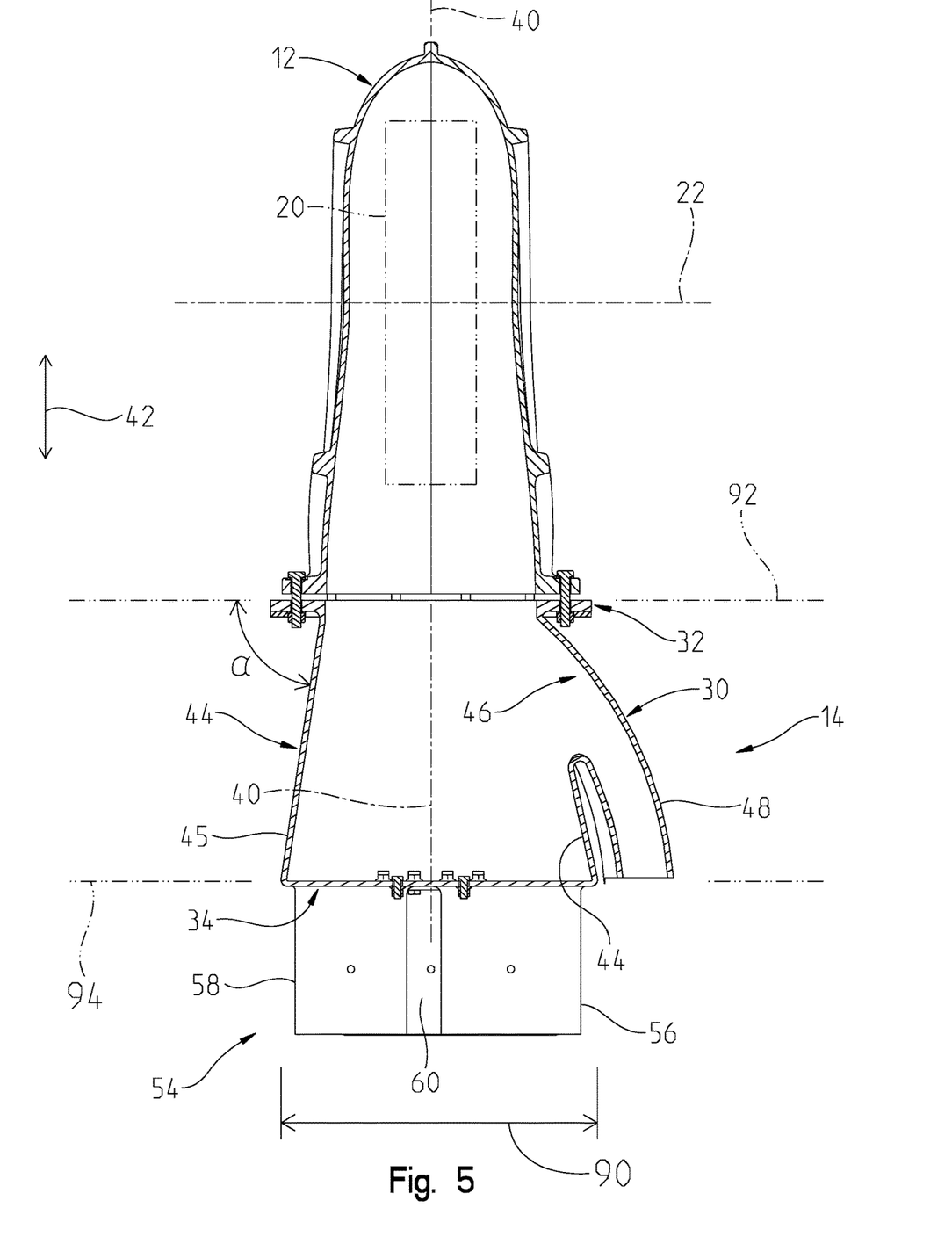
FIG. 5 is a top section view of the plenum and the blower shown in FIG. 4.

As shown in FIGS. 4 and 5, the first end 32 of the body portion 30 defines (or is defined in) a first plane 92, the second end 34 of the body portion 30 defines (or is defined in) a second plane 94. The first plane 92 and the second plane 94 are substantially parallel to one another and perpendicular to the longitudinal axis 40 of the plenum 14. As illustrated in FIGS. 4 and 5, when viewed in any plane perpendicular to the first plane 92, the side wall 44 includes a segment 45 extending at a constant angle α relative to the plane 92 between the first end 32 and the second end 34 of the body portion 30. As such, when viewed in any plane perpendicular to the first plane 92, the segment 45 extends at a constant angle (albeit a different constant angle in each case) relative to each of the first end 32, the second end 34, and the longitudinal axis 40. It should be appreciated that the constant angles described here will differ based on which plane the angles are viewed in; however, what is meant by constant angle is that the magnitude of the angle does not change over the length of the segment 45 when the plenum 14 is viewed in any one plane.

Several segments 45 make up the side wall 44. Therefore, while the slope or pitch of the side wall 44 varies as the side wall 44 extends around its longitudinal axis 40, the slope or pitch of the side wall 44 is constant along any one segment 45. It is for this reason that the side wall 44 may be referred to as a uniformly-sloped side wall 44. The uniformly-sloped feature of the side wall 44 is advantageous in comparison to undulating or curved plenum side walls because the uniformly-sloped side wall prevents irregular airflow within the plenum 14 and thus optimizes or maximizes airflow across the plenum 14 and to the ports 48, 54.

It should be appreciated that the parallel arrangement of the first side 32 and the second side 34 of the plenum 14 is particularly advantageous (especially when used in combination with the perpendicular arrangement of the fan-blade axis of rotation 22 and the uniformly-sloped side wall 44). This is because these features facilitate a uniform distribution of air flow across the plenum and to the outlet 38 of the plenum 14. In other words, with this careful arrangement, the force and path of the air flow toward each aperture 52 is substantially the same, such that the problem of irregular or agitated airflow to various primary ports 54 is mitigated with the plenum 14.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A plenum adapted for use with an air seeding machine, the plenum comprising:
   a body portion including:
      a first end,
      a second end opposite the first end,
      a longitudinal axis extending through the first end and the second end, and
      a side wall extending around the longitudinal axis between the first end and the second end to form an interior portion of the plenum;
   a plurality of primary ports coupled to the second end of the body portion; and
   a plurality of bleed ports coupled to the side wall of the body portion;
   wherein:
      the first end of the body portion is defined on a first plane and defines an inlet of the body portion,
      the second end of the body portion is defined on a second plane that is substantially parallel to the first plane and defines an outlet of the body portion, and
      when the sidewall is viewed in any cross-sectional plane perpendicular to the first plane and the second plane, each visible portion of the side wall is a segment that extends at a constant angle relative to the longitudinal axis throughout its full length of extension between the first end and the second end of the body portion.

2. The plenum of claim 1, wherein the second end of the body portion is substantially elliptically-shaped.

3. The plenum of claim 2, wherein the first end of the body portion is substantially circularly-shaped.

4. The plenum of claim 1, wherein the first plane is substantially perpendicular to the longitudinal axis.

5. The plenum of claim 4, wherein the first plane and the second plane are substantially parallel to one another.

6. The plenum of claim 1, wherein:
   the side wall includes an aperture opening directly from the interior of the body portion to the bleed port.

7. The plenum of claim 1, wherein:
   each primary port of the plurality of primary ports includes a first end and a second end spaced apart from the second end, and
   the plenum further comprises a plurality of valves each positioned in a primary port and spaced apart from the first end and the second end of the primary port.

8. The plenum of claim 7, wherein the plurality of valves are butterfly valves including:
   a first pair of butterfly valves having a first pair of commonly-sized blockers coupled to a first rod that is configured to rotate the first pair of commonly-sized blockers to open and close the first pair of butterfly valves,
   a second pair of butterfly valves having a first pair of commonly-sized blockers coupled to a second rod that is configured to rotate the second pair of commonly-sized blockers to open and close the second pair of butterfly valves, and
   a third pair of butterfly valves having a third pair of commonly-sized blockers coupled to a third rod that is configured to rotate the third pair of commonly-sized blockers to open and close the third pair of butterfly valves.

9. A plenum adapted for use with an air seeding machine, the plenum comprising:
   a body portion including:
      a first end,
      a second end opposite the first end,
      a longitudinal axis extending through the first end and the second end, and
      a side wall extending around the longitudinal axis between the first end and the second end to form an interior portion of the plenum;
   a plurality of primary ports coupled to the second end of the body portion; and
   a plurality of bleed ports coupled to the side wall of the body portion;
   wherein the first end of the body portion defines an inlet of the body portion;
   wherein the second end of the body portion defines an outlet of the body portion; and
   wherein the plurality of primary ports includes:
      a first pair of commonly-sized ports,
      a second pair of commonly-sized ports differently-sized than the first pair of commonly sized ports, and
      a third pair of commonly-sized ports differently-sized than each of the first pair of commonly-sized ports and the second pair of commonly-sized ports.

10. The plenum of claim 9, wherein:
   each primary port of the plurality of primary ports includes a first end and a second end spaced apart from the second end, and
   the plenum further comprises a plurality of valves each positioned in a primary port between and spaced apart from the first end and the second end of the primary port.

11. The plenum of claim 10, wherein the plurality of valves are butterfly valves including:
   a first pair of butterfly valves having a first pair of commonly-sized blockers coupled to a first rod that is configured to rotate the first pair of commonly-sized blockers to open and close the first pair of butterfly valves, a second pair of butterfly valves having a first pair of commonly-sized blockers coupled to a second rod that is configured to rotate the second pair of commonly-sized blockers to open and close the second pair of butterfly valves, and a third pair of butterfly valves having a third pair of commonly-sized blockers coupled to a third rod that is configured to rotate the third pair of commonly-sized blockers to open and close the third pair of butterfly valves.

12. The plenum of claim 9, wherein the second end of the body portion is substantially elliptically-shaped.

13. The plenum of claim 12, wherein the first end of the body portion is substantially circularly-shaped.

14. The plenum of claim 9, wherein:

the first end of the body portion defines a first plane, and the inlet of the body portion is disposed in the first plane.

15. The plenum of claim 14, wherein:

the second end of the body portion defines a second plane, and the outlet of the body portion is disposed in the second plane.

16. The plenum of claim 15, wherein the first plane is substantially perpendicular to the longitudinal axis.

17. The plenum of claim 16, wherein the first plane and the second plane are substantially parallel to one another.

18. A plenum adapted for use with an air seeding machine, the plenum comprising:

a body portion including:

a first end that defines an inlet of the body portion, a second end opposite the first end that defines an outlet of the body portion, a longitudinal axis that extends through the first end and the second end, and a side wall extending around the longitudinal axis between the first end and the second end to form an interior portion of the plenum; and a plurality of primary ports coupled to the second end of the body portion;

wherein the first end of the body portion is a circle;

wherein the second end of the body portion is an ellipse; and wherein a long axis of the ellipse is perpendicular to a direction of flow between the inlet and the outlet of the body portion.

19. The plenum of claim 18, wherein the longitudinal axis extends through a center of the circle and a center of the ellipse.

20. The plenum of claim 18, wherein the inlet of the body portion is defined along a first plane;

wherein the outlet of the body portion is defined along a second plane; and wherein the longitudinal axis is substantially perpendicular to the first plane and the second plane.

* * * * *